(12) United States Patent
Green et al.

(10) Patent No.: US 10,618,746 B2
(45) Date of Patent: Apr. 14, 2020

(54) TOTE EXCHANGE MODULE

(71) Applicant: Intelligrated Headquarters, LLC, Mason, OH (US)

(72) Inventors: Todd Eliot Green, Baltimore, MD (US); Long Ha, Mason, OH (US); Darius Scott, Baltimore, MD (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/130,359

(22) Filed: Sep. 13, 2018

(65) Prior Publication Data

US 2020/0087081 A1    Mar. 19, 2020

(51) Int. Cl.
*B65G 47/82*    (2006.01)
*B65G 47/52*    (2006.01)

(52) U.S. Cl.
CPC ...... *B65G 47/52* (2013.01); *B65G 2201/0258* (2013.01)

(58) Field of Classification Search
None
See application file for complete search history.

(56) References Cited

U.S. PATENT DOCUMENTS

| | | | | |
|---|---|---|---|---|
| 5,868,238 A | * | 2/1999 | Bonnet | B65G 13/10 198/370.09 |
| 6,068,105 A | * | 5/2000 | Darwish | B65G 47/766 198/370.02 |
| 6,182,815 B1 | * | 2/2001 | Eggebrecht | B07C 1/04 198/468.1 |
| 6,651,800 B2 | * | 11/2003 | Baclija | B65B 35/58 198/382 |

OTHER PUBLICATIONS

DEMO3D.com, Demo3D Spiral Conveyor with Box Turner and Pusher, Aug. 23, 2010, YouTube, 2 pages, https://www.youtube.com/watch?v=2Rnav2_58Ow, Nov. 27, 2018.
Conveyor Systems Ltd, Pack Pusher Unit (Roller Conveyor), Nov. 17, 2014, YouTube, 2 pages, https://www.youtube.com/watch?v=rHpFad8ePlk, Nov. 27, 2018.
APC Storage Solutions SA, Live footage: conveyors for boxes in action, Apr. 12, 2012, YouTube, 2 pages, https://www.youtube.com/watch?v=v5i327qJYOA, Nov. 27, 2018.
Adept Conveyor, Fruit and vegetable handling conveyor system, Aug. 20, 2013, YouTube, 2 pages, https://www.youtube.com/watch?v=NY6qJJ8PxRs, Nov. 27, 2018.

* cited by examiner

*Primary Examiner* — Kavel Singh
(74) *Attorney, Agent, or Firm* — Alston & Bird LLP

(57) ABSTRACT

The present disclosure relates to a tote exchange module for handling totes. The tote exchange module includes a pick-up conveyor and an L-shaped pushing member. The L-shaped pushing member having a forward element and a side element. The forward element may be secured to the side element at the one end. Further, an actuator may move the L-shaped pushing member from a first position proximate a first side of the pick-up conveyor to a second position proximate a second side, opposite to the first side, of the pick-up conveyor. The second position defining a pick-up location.

20 Claims, 5 Drawing Sheets

TOTE EXCHANGE MODULE

TECHNOLOGICAL FIELD

Example embodiments of the present invention relate generally to a material handling system, and more particularly, to a system for conveying totes for handling.

BACKGROUND

In a high-volume distribution and fulfillment center, containers and/or totes handling methods and systems play an important part in overall efficiency of the distribution center. Conventionally, tote handling may include interaction with a mobile system, such as, a tote robot, which may pick-up empty totes from a conveyor and may place replenished totes onto the conveyor. However, it is important and challenging to present a tote in the right location, orientation, and/or position each time for the tote robot to pick-up the tote.

Applicant has identified several technical challenges associated with tote handling and other associated systems and methods. Through applied effort, ingenuity, and innovation, many of these identified challenges have been overcome by developing solutions that are included in embodiments of the present invention, many examples of which are described in detail herein.

SUMMARY

The following presents a simplified summary to provide a basic understanding of some aspects of the disclosed tote exchange module. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to systems and methods for handling totes in a material handling environment. According to at least one aspect of the present disclosure, a tote exchange module is provided. The tote exchange module may include a pick-up conveyor having a forward end, an opposite trailing end, a first side and a second side approximately parallel to a transport direction of the pick-up conveyor, and a conveyance system positioned between the first side and the second side, to transport one or more totes along the conveyance system in the transport direction, the transport direction of the pick-up conveyor being in the direction from the trailing end toward the forward end. Further, the second side may include a wall. The tote exchange module further includes an L-shaped pushing member having a forward element, the forward element including a forward surface-oriented transverse to the transport direction and having a first forward surface end and a second forward surface end, and a side element, the side element including a side surface oriented approximately parallel to the transport direction and having a forward side surface end and a trailing side surface end. Further, the forward element may be secured to the side element at the first forward surface end of the forward surface and the forward side surface end of the side surface. The forward side surface end of the side surface may be closer to the forward end than the trailing side surface end. The second forward surface end may be closer to the second side than the first forward surface end. The tote exchange module may further include an actuator for moving the L-shaped pushing member from a first position proximate the first side to a second position proximate the wall.

According to one or more embodiments of the present disclosure, when a tote travels along the conveyance system in the transport direction, the forward surface may stop movement of the tote in the transport direction, the side surface may cause movement of the tote in a direction transverse to the transport direction, and the wall may receive the tote in the second position.

According to one or more embodiments of the present disclosure, the actuator may further include an actuating arm coupled to the side element of the L-shaped pushing member, the actuating arm may reciprocate transverse to the transport direction from the first side towards the second side of the pick-up conveyor.

According to one or more embodiments of the present disclosure, the second position may define a pick-up location of the tote.

According to one or more embodiments of the present disclosure, the tote exchange module may further include one or more photoeyes, the one or more photoeyes may confirm at least one of the presence of a tote at the pick-up location or the orientation of the tote located at the pick-up location.

According to one or more embodiments of the present disclosure, the tote exchange module may further include an exchange equipment for picking up the tote located at the pick-up location responsive to the processing of data captured by the one or more photoeyes indicating at least one of the presence or orientation of the tote satisfies a threshold requirement. Further, the exchange equipment may transport the empty tote from the pick-up location to another location in the system to be filled. The exchange equipment then brings back filled totes to a tote receiving position corresponding to a second conveyor (e.g., the transport conveyor or a different conveyor). An exchange is then performed by the exchange equipment, which ejects a filled tote out to the tote receiving position, while simultaneously picking up a new empty tote from the pick-up location, in an example embodiment.

According to another aspect of the present disclosure, a tote exchange module is provided. The tote exchange module may include a tote receiving position, a second conveyor, and a tote release system for moving a tote located at the tote receiving position onto the second conveyor. In various embodiments, the second conveyor is the transport conveyor or a different conveyor. The tote release system may include a plurality of timing belts that are driven together via a set of timing pulleys clamped to a motorized drive roller.

According to one or more embodiments of the present disclosure, the at least one of the plurality of timing belts may include one or more cleats.

According to one or more embodiments of the present disclosure, the one or more cleats may receive and align the tote on the at least one of the plurality of timing belts.

According to one or more embodiments of the present disclosure, the tote release system may receive the tote from an exchange equipment in the tote release position.

According to one or more embodiments of the present disclosure, the tote release system may move the tote in a second transport direction towards the second conveyor.

According to one or more embodiments of the present disclosure, the one or more cleats may further include one or more proximity sensor targets for detecting the presence of the tote on the at least one of the plurality of timing belts.

According to one or more embodiments of the present disclosure, the tote exchange module may further include one or more photoeyes for confirming presence of a tote on the exchange equipment, and/or one or more proximity sensors for confirming the location of the cleats.

According to one or more embodiments of the present disclosure, the plurality of timing belts may move the one or more cleats in a receiving position responsive to the processing of data captured by the one or more photoeyes indicating the presence of the tote on the exchange equipment.

According to another aspect of the present disclosure, a tote exchange module is provided. The tote exchange module may include a pick-up conveyor having a forward end, an opposite trailing end, a first side and a second side approximately parallel to a transport direction of the pick-up conveyor, and a conveyance system positioned between the first side and the second side, for transporting one or more totes along the conveyance system in the transport direction, the transport direction of the conveyor being in the direction from the trailing end toward the forward end, the second side having a wall. The tote exchange module may further include an L-shaped pushing member having a forward element, the forward element including a forward surface orientated transverse to the transport direction and having a first forward surface end and a second forward surface end, and a side element, the side element including a side surface oriented approximately parallel to the transport direction and having a forward side surface end and a trailing side surface end. The forward element may be secured to the side element at the first forward surface end of the forward surface and the forward side surface end of the side surface. The forward side surface end of the side surface may be closer to the forward end than the trailing side surface end. The second forward surface end may be closer to the second side than the first forward surface end. The tote exchange module may further include an actuator to move the L-shaped pushing member from a first position proximate the first side to a second position proximate the wall, the second position defining a pick-up location. The tote exchange module may further include a second conveyor, a tote receiving position proximate the second conveyor, and a tote release system for moving a tote located at the tote receiving position onto the second conveyor. In various embodiments, the second conveyor may be the transport conveyor or a different conveyor.

According to one or more embodiments of the present disclosure, the tote exchange module may further include an exchange equipment for picking up a tote located at the pick-up location and placing the tote at the tote receiving position.

According to one or more embodiments of the present disclosure, the tote release system may move the tote in a second transport direction, opposite to the transport direction of the pick-up conveyor, towards the second conveyor.

According to one or more embodiments of the present disclosure, the tote release system may be located adjacent to the second side of the pick-up conveyor.

According to one or more embodiments of the present disclosure, the exchange equipment may pick-up empty totes from the pick-up conveyor and place filled totes on the tote release system.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
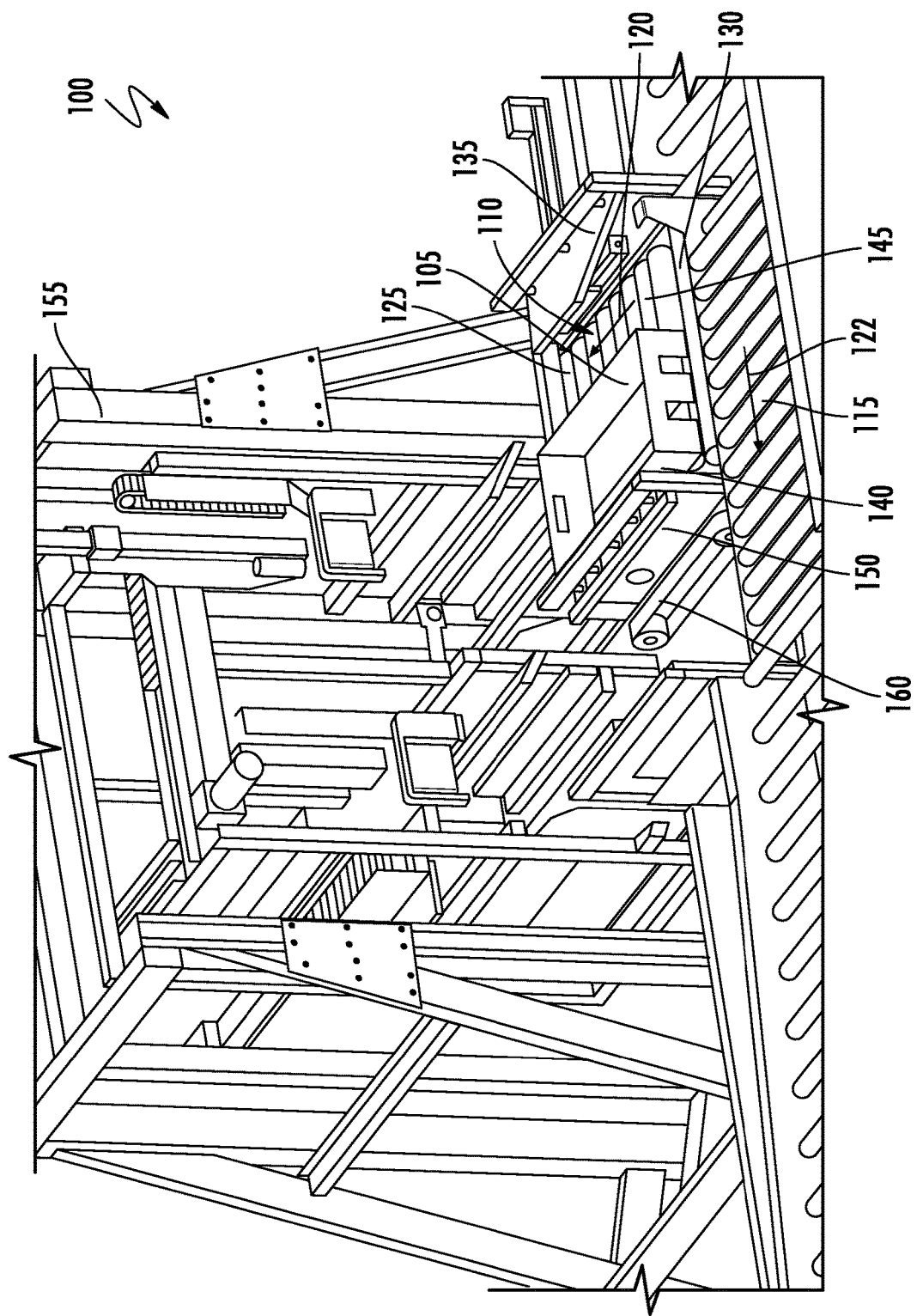
FIG. 1 illustrates a rear perspective view of a tote exchange module in accordance with an embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As described above, in a conventional distribution and/or order fulfillment center, containers and/or totes are generally used to store goods, temporarily for handling and/or for a longer duration in a storage and retrieval system. Totes, both empty and the ones carrying goods, may need to be handled by various material handling components and/or sub-systems of the distribution and/or order fulfillment center. For example, exchange equipment, such as a tote robot, may pick-up empty totes from a conveyor and may place replenished and/or filled totes onto the same and/or another conveyor. Thus, it is required to present totes in a predefined pick-up location, orientation, and/or position for the tote robot to be able to pick-up the tote correctly. In certain distribution and/or order fulfillment centers, parts of the above process may require manual movement and/or alignment of totes. Automating the entire tote handling process can reduce time, manpower, and costs. An automated system can present the totes in the correct pick-up location for the tote robot, and may receive replenished totes from the tote robot. Thus, improving overall efficiency of the high-volume distribution and/or order fulfillment center.

The tote exchange module described herein, in accordance with one or more embodiments of the present disclosure, may interface between an exchange equipment and one or more tote conveyors, for automatically presenting a tote in a pick-up location to the exchange equipment and/or receiving the tote in a tote release position from the exchange equipment.

FIG. 1 illustrates a perspective view of a tote exchange module 100 for handling totes 105, in accordance with one or more embodiments of the present disclosure. As shown in FIG. 1, the tote exchange module 100 may include a pick-up conveyor 110 and a second conveyor 115. The pick-up conveyor 110 may have a forward end 125 and a trailing end 130, opposite to the forward end 125. The pick-up conveyor 110 may convey a tote 105 in a transport direction 120 from the trailing end 130 towards the forward end 125, as shown. The pick-up conveyor 110 may further have a first side 135 and a second side 140 that are both approximately parallel to the transport direction 120. The second side 140 may include a wall 150. The pick-up conveyor 110 may include a conveyance system 145, such as, a roller bed, belt conveyor, and/or any known means of conveyance. The pick-up conveyor 110 may transport the tote 105 along the conveyance system 145 in the transport direction 120.

As described above, the tote exchange module 100 may further include the transport conveyor 115, as shown in FIG. 1. In accordance with an exemplary embodiment of the present disclosure, the transport conveyor 115 may be located behind the pick-up conveyor 110, such that the direction of conveyance, that is, a transport direction 122 of the transport conveyor 115 may be perpendicular and/or transverse to the transport direction 120 of the pick-up conveyor 110. In an example embodiment, a portion of the transport conveyor 115 may have a transport direction 122 that is parallel or anti-parallel to the transport direction 120 of the pick-up conveyor 110. Various configurations of the pick-up conveyor 110 and transport conveyor 115 are considered.

The tote exchange module 100 may further include an exchange equipment 155 for picking up a tote 105 located at a pick-up location on the pick-up conveyor 110, and placing a tote 105 on a tote release system 160, as shown in FIG. 1. In an example embodiment, the exchange equipment is configured to pick up a tote 105 located at the pick-up location on the pick-up conveyor 110 and simultaneously place another tote 105 on the tote release system 160. In an embodiment of the present disclosure, the exchange equipment 155 may be a tote robot for picking up empty totes from the pick-up conveyor 110 and placing filled totes on the tote release system 160. The pick-up conveyor 110 may present the tote 105 in a predefined pick-up location at a predefined orientation to the exchange equipment 155. Further, the tote release system 160 may convey the tote 105 received from the exchange equipment 155 onto the transport conveyor 115. In an embodiment, the tote release system 160 may be located adjacent to the second side 140 of the pick-up conveyor 110.

Figure 2:
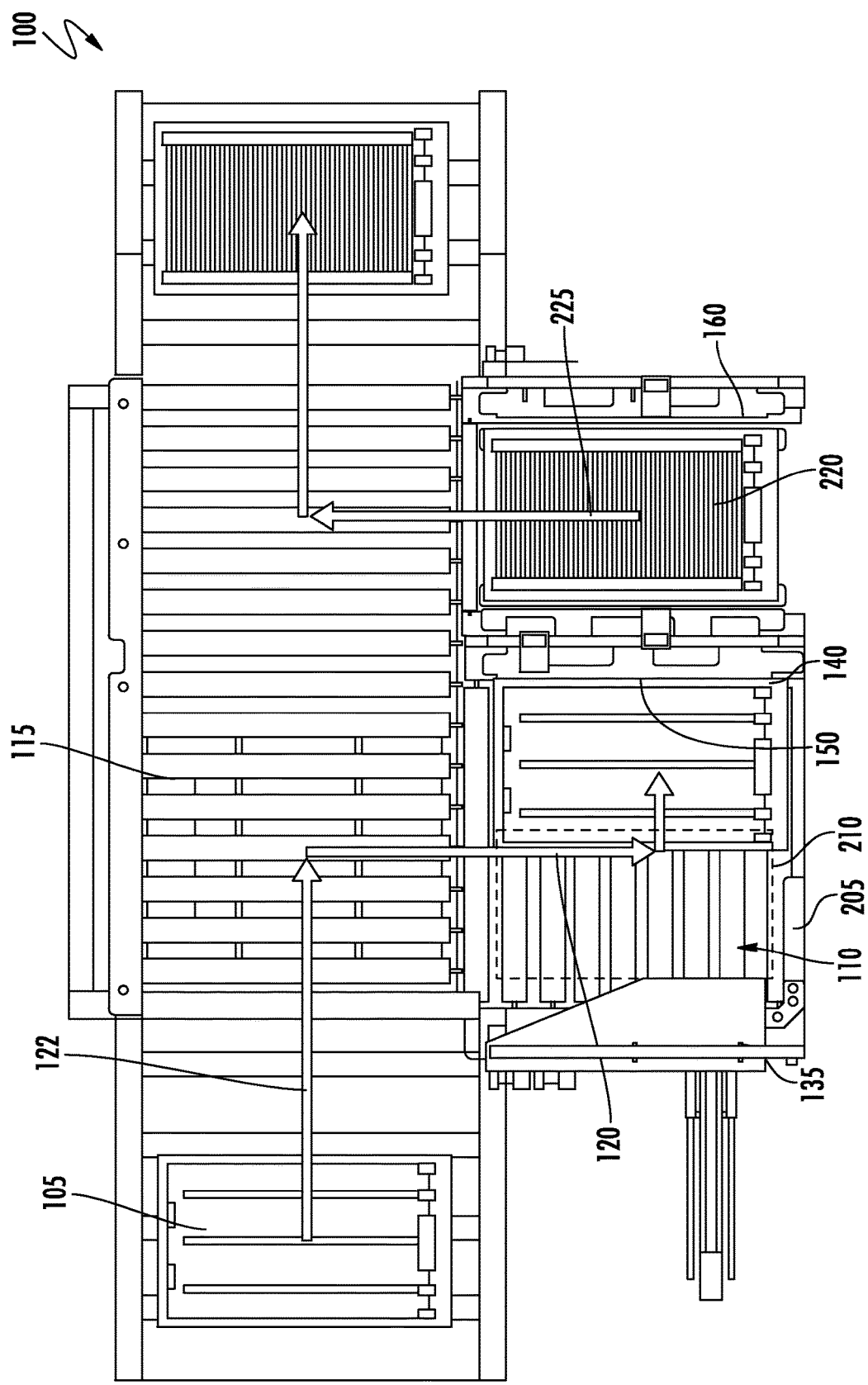
FIG. 2 illustrates a top view of the tote exchange module depicting the direction of flow of a tote, in accordance with one or more embodiment of the present disclosure.

FIG. 2 illustrates a perspective view of the tote exchange module 100, in accordance with one or more embodiments of the present disclosure. As shown in FIG. 2, in accordance with an exemplary embodiment of the present disclosure, a tote 105 may travel on the transport conveyor 115 along the transport direction 122 of the transport conveyor 115, as shown. In an embodiment, the tote 105 may be an empty tote. The tote exchange module 100 may include a plurality of sensors, imagers, and the like for detecting at least a position, location, and/or orientation of the one or more totes travelling on the tote exchange module 100. In an embodiment, the tote exchange module 100 includes one or more photoeyes (not shown) for detecting and/or confirming a position, location, and/or orientation of the one or more totes. Further, as shown in FIG. 2, the tote exchange module 100 may detect, through the one or more photoeyes, for example, that the tote 105 has reached the intersection of the transport conveyor 115 and the pick-up conveyor 110. In various embodiments, a photoeye is a photoelectric sensor. For example, a photoeye may be used to determine the distance, absence, and/or presence of an object by using a light transmitter (e.g., infrared or visible light transmitter) and a photoelectric receiver.

The tote exchange module 100 may further include means to transfer the tote 105 from the transport conveyor 115 to the pick-up conveyor 110. In an embodiment, the tote exchange module 100 may include a right angle divert (RAD) paddle (not shown) coupled to the transport conveyor 115, such that the RAD paddle may push the tote 105 in a direction transverse to the transport direction 122 of the transport conveyor 115, towards the pick-up conveyor 110.

In accordance with the present disclosure, the tote exchange module 100 may further include an L-shaped pushing member 205 coupled to the first side 135 of the pick-up conveyor 110. The L-shaped pushing member 205 may stop the movement of the tote 105 in the transport direction 120 of the pick-up conveyor 110 when the tote 105 is transferred from the transport conveyor 115 to the pick-up conveyor 110, as described above. That is, the tote 105 may abut against the L-shaped pushing member 205 in a first position 210, as shown in FIG. 2. In the first position 210, the tote 105 and the L-shaped pushing member 205 may be closer to the first side 135 of the pick-up conveyor 110, in the middle of the pick-up conveyor, and/or the like. Further, in accordance with the present disclosure, the L-shaped pushing member 205 may push the tote 105 in a direction transverse to the transport direction 120 of the pick-up conveyor 110, as shown in FIG. 2. The tote 105 may abut and come to rest against the wall 150 on the second side 140 of the pick-up conveyor 110, as shown. Thus, the L-shaped pushing member 205 moves from the first position 210 to a second position 215 and thereby moves the tote 105 into a predefined position and/or orientation at the second position 215. As shown in FIG. 2, in the second position 215, the tote 105 and the L-shaped pushing member 205 are closer to the second side 140 of the pick-up conveyor 110. In an embodiment, the second position 215 may define a pick-up location of the tote 105. That is, the second position 215 may correspond to a predefined position, location, and/or orientation of the tote 105 for an automated pick-up operation, for example, by the exchange equipment (not shown), as defined with reference to FIG. 1.

Further, the tote exchange module 100 may include the tote release system 160, as shown in FIG. 2. The tote release system 160 may receive the tote 105 from an automated tote drop off system, such as, for example, the exchange equipment (not shown), as defined with reference to FIG. 1. In an embodiment, the tote 105 may be a replenished tote. The tote release system 160 may receive the tote 105 in a tote receiving position 220. In an embodiment, the tote receiving position 220 may correspond to predefined position, location, and/or orientation of the tote 105 when released onto the tote release system 160. The tote release system 160 may then convey the tote 105 in a second transport direction 225 (e.g., opposite to the transport direction 120 of the pick-up conveyor 110), as shown in FIG. 2. The tote release system 160 may transport the tote 105 along the second transport direction 225 onto a second conveyor (e.g., the transport conveyor 115 and/or a different conveyor). Further, the transport conveyor 115 may convey the tote 105 received from the tote release system 160 in a direction 122 transverse to the second transport direction 225.

Thus, a tote 105 which may initially be empty, may be transported automatically from the transport conveyor 115 to the pick-up conveyor 110. The tote exchange module 100 may reposition the tote 105 in a pick-up location for an exchange equipment to pick-up and replenish the tote 105. Further, the tote release system 160 may receive the tote 105, after replenishment, and may convey the tote 105 back onto the transport conveyor 115 for further handling. In various embodiments, the tote 105 may be picked up at the pick-up location and moved to another conveyor (e.g., a third conveyor) by the exchange equipment.

Figure 3:
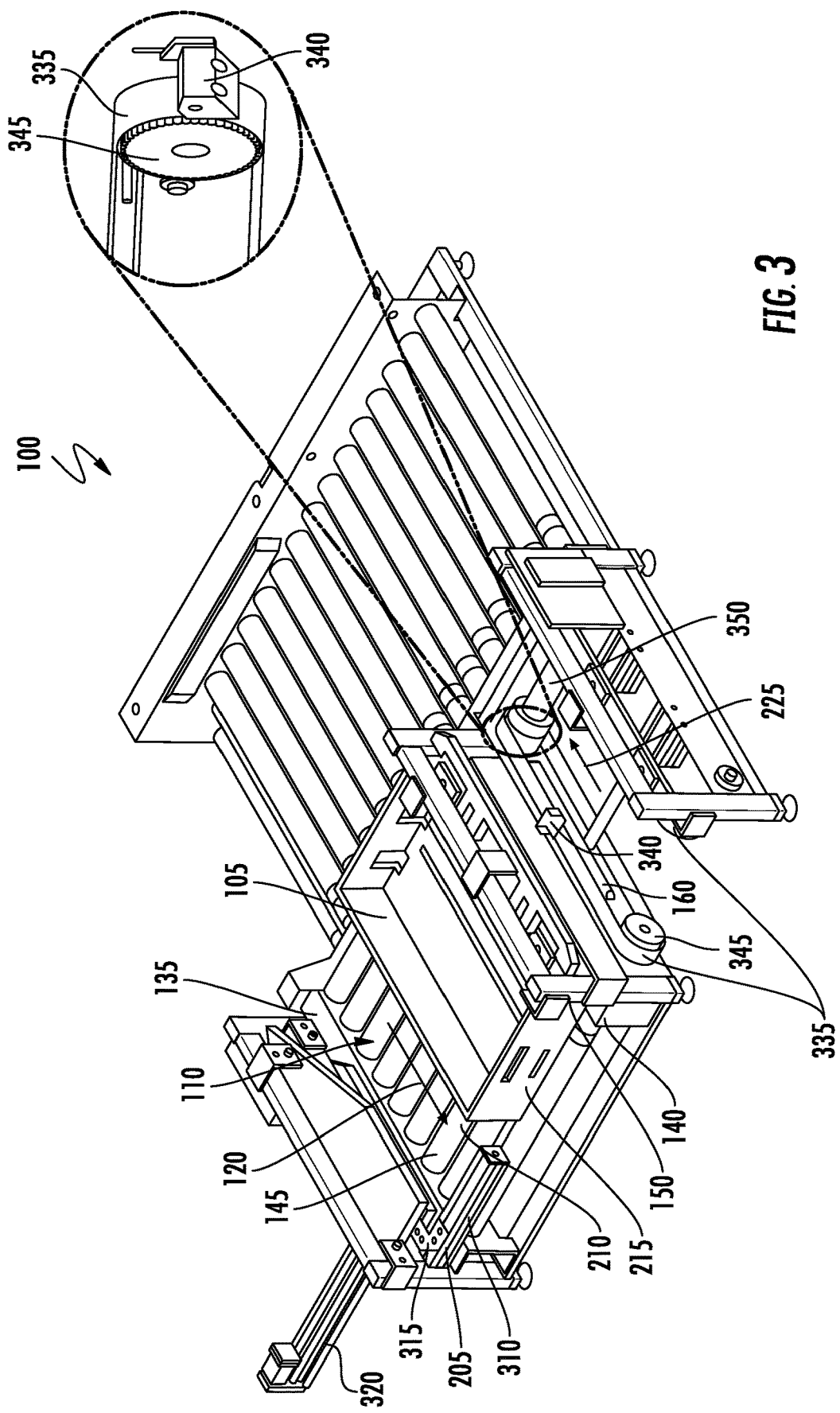
FIG. 3 illustrates a front perspective view of the tote exchange module in accordance with one or more embodiments of the present disclosure.

FIG. 3 illustrates a perspective view of the tote exchange module 100, in accordance with one or more embodiments of the present disclosure. As shown in FIG. 3, the tote exchange module 100 includes the pick-up conveyor 110, the transport conveyor 115, and the tote release system 160. The pick-up conveyor 110 includes the L-shaped pushing member 205 having a forward element 310 and a side element 315. In an embodiment, the forward element 310 may be orientated transverse to the transport direction 120 of the pick-up conveyor 110. The side element 315 may be orientated parallel to the transport direction 120 of the pick-up conveyor 110. The forward element 310 and the side element 315 may be coupled to each other at one end, as shown in FIG. 3, forming the L-shaped pushing member 205. The tote exchange module 100 may further include an actuator 320 coupled to the L-shaped pushing member 205. The actuator 320 may move the L-shaped pushing member 205 from the first position 210 proximate the first side 135 to the second position 210 proximate the wall 150 of the pick-up conveyor 110. When actuated by the actuator 320, the L-shaped pushing member 205 moves the tote 105 to the second position 210 defining a pick-up location of the tote 105.

Further, as shown in FIG. 3, the tote exchange system 100 includes the tote release system 160. In an embodiment, the tote release system 160 includes one or more timing belts 335 that are driven together via a set of timing pulleys 345 clamped to a motorized drive roller 350, as shown in FIG. 3. As is commonly known in the art, the one or more timing belts 335 may be toothed belts with teeth and/or holes on belt's inner circumference. Further, the set of timing pulleys 345 may be specialized pulleys that have teeth or pockets around the outside diameter of the pulley body. For driving the timing belts 335, the timing pockets of the set of timing pulleys 345 may engage drive lugs on timing belts 335's inner circumference. These teeth or pockets are used only for timing, not for power transmission, in an example embodiment. Further, the set of timing pulleys 345 may be driven by the motorized drive roller 350. In an embodiment, the motorized drive roller 350 may include a motor inbuilt within the body of the motorized drive roller 350. In another embodiment, the motor external to the roller body and may be coupled to the motorized drive roller 350. The set of timing pulleys 345 may be coupled to each end of the motorized drive roller 350, as shown in FIG. 3.

In an embodiment, the timing belts 335 may further include one or more cleats 340 coupled to the timing belts 335, as shown in FIG. 3. The one or more cleats 340 may refer to a protrusion inbuilt and/or coupled to the timing belt 335 for maintaining an alignment of the tote 105 released on the one or more timing belts 335. Specifically, the one or more cleats 340 may contact the edges and/or ends of the tote 105 while the tote 105 is conveyed in the second transport direction 225 towards the transport conveyor 115. The one or more cleats 340 maintain contact with the ends and/or edges of the tote 105, and push the tote 105 from the tote release system 160 onto the transport conveyor 115. Once the tote 105 moves to the transport conveyor 115, the one or more cleats 340 are recirculated over the set of timing pulleys 345 along with the timing belt 335. In an embodiment, the one or more cleats 340 further comprise one or more proximity sensor targets (not shown), such as a screw head or plate, to be detected by a proximity sensor but not limited to, a magnetic proximity sensor, to detect the presence of the belt cleats 340 on the timing belts 335. Further, the tote release system 160 may include one or more photoeyes to confirm presence of a tote 105 on the exchange equipment awaiting to be released onto the tote release system 160. In response to the processing of data captured by the one or more photoeyes indicating the presence of the tote 105 on the exchange equipment, the motorized drive roller 350 may drive the plurality of timing belts 335 through the set of timing pulleys 345. In an embodiment, the timing belts 335 may be driven such that the one or more cleats 340 may be positioned in a receiving position. In an embodiment, the receiving position of the one or more cleats 340 may correspond to the one or more cleats 340 being positioned behind the tote 105, contacting a trailing edge of the tote 105. Thus, the one or more cleats 340 may align and push the tote 105 onto a second conveyor (e.g., the transport conveyor 115 or a different conveyor). It should be noted that the tote release system 160 is not limited to the one or more timing belts 335, and any known means of conveyance, such as, but not limited to, roller bed, belt conveyor, and the like, may be used to receive the tote 105 and convey the received tote 105 onto the second conveyor (e.g., the transport conveyor 115 or a different conveyor).

Figure 4:
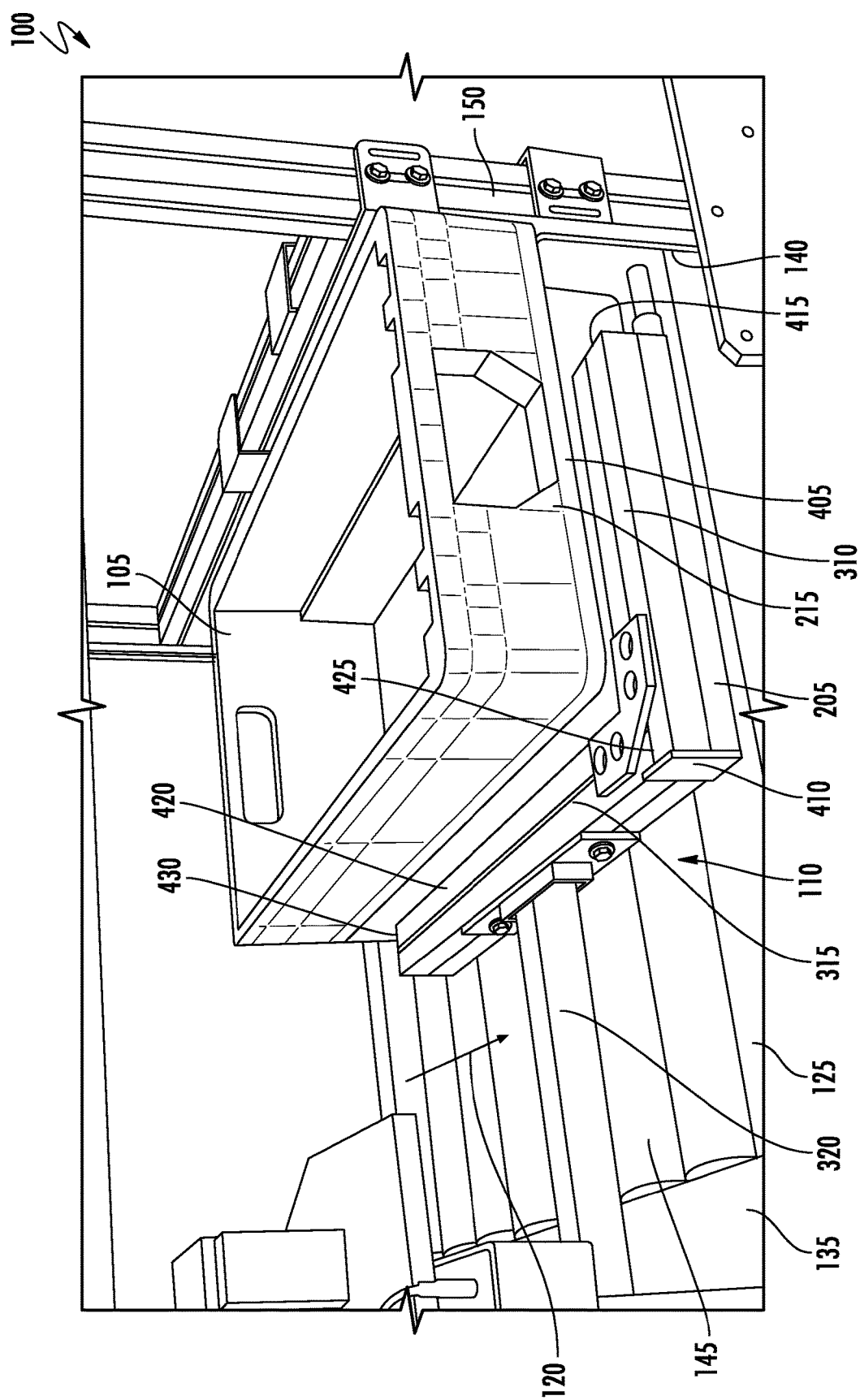
FIG. 4 illustrates another front perspective view of the pick-up conveyor carrying a tote in accordance with one or more embodiments of the present disclosure.

FIG. 4 illustrates a perspective view of the tote exchange module 100 depicting the pick-up conveyor 110 carrying a tote 105, in accordance with one or more embodiments of the present disclosure. As shown in FIG. 4, the tote exchange module 100 includes the L-shaped pushing member 205 having the forward element 310 and the side element 315. Further, as shown in FIG. 4, the forward element 310 includes a forward surface 405 oriented transverse to the transport direction 120. The forward surface 405 may further include a first forward surface end 410 and a second forward surface end 415, as shown. The side element 315 of the L-shaped pushing member 205 includes a side surface 420 oriented approximately parallel to the transport direction 120, as shown in FIG. 4. The side surface 420 may further include a forward side surface end 425 and a trailing side surface end 430. In accordance with the embodiments of the present disclosure, the forward element 310 may be secured to the side element 315 at the first forward surface end 410 of the forward surface 405 and the forward side surface end 425 of the side surface 420, as shown in FIG. 4. Further, the forward side surface end 425 of the side surface 420 may be closer to the forward end 125 of the pick-up conveyor 110 than the trailing side surface end 430. Further, the second forward surface end 415 may be closer to the second side 140 of the pick-up conveyor 110 than the first forward surface end 410.

In accordance with the present disclosure, when the tote 105 travels along the conveyance system 145 in the transport direction 120, the forward surface 405 of the L-shaped pushing member 205 may stop movement of the tote 105 in the transport direction 120. That is, the tote 105 may abut against the forward surface 405. In an embodiment, the L-shaped pushing member 205 may be in the first position (not shown) closer to the first side 135 for receiving the tote 105 from the transport conveyor 115. Further, as described above, the L-shaped pushing member 205 may be actuated by the actuator 320 to move the L-shaped pushing member 205 from the first position (not shown) to the second position 215 closer to the wall 150, thereby causing the tote 105 to be moved to the second position 215, as shown in FIG. 4. Thus, the side surface 420 of the L-shaped pushing member 205 may cause movement of the tote 105 in a direction transverse to the transport direction 120. Further, the wall 150 may receive the tote 105 in the second position 215. The second position 215 may define a pick-up location for the tote 105. Further, once the tote 105 is determined to be positioned in the second position 215 and/or the exchange equipment (not shown) is detected to be ready for pick-up, for example, by one or more photoeyes, the L-shaped pushing member 205 may be retracted away from the tote 105 to a third position (not shown) by the actuator 320. The L-shaped pushing member 205 may be moved to the third position to clear way for the tote 105 to be picked-up, for example, by the exchange equipment (not shown). In an embodiment, the third position may be the same as the first position. In another embodiment, the third position may be an intermediate position between the first position and the second position 215. In an example embodiment, the third position is a position at which the L-shaped pushing member 205 does not engage a tote 105 traveling along the transport conveyor 115.

Figure 5A:
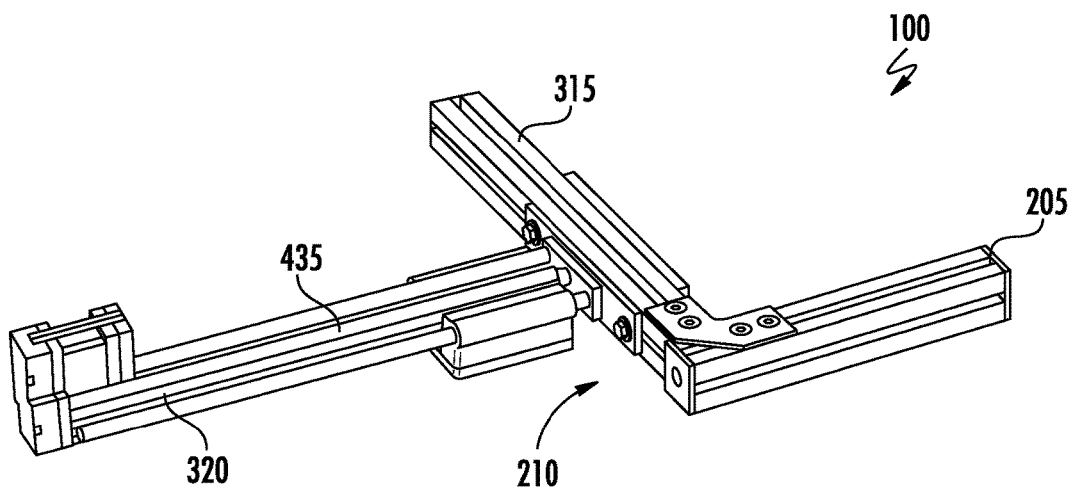
FIG. 5a-5b illustrate perspective views of an L-shaped pushing member in accordance with one or more embodiment of the present disclosure.
Figure 5B:
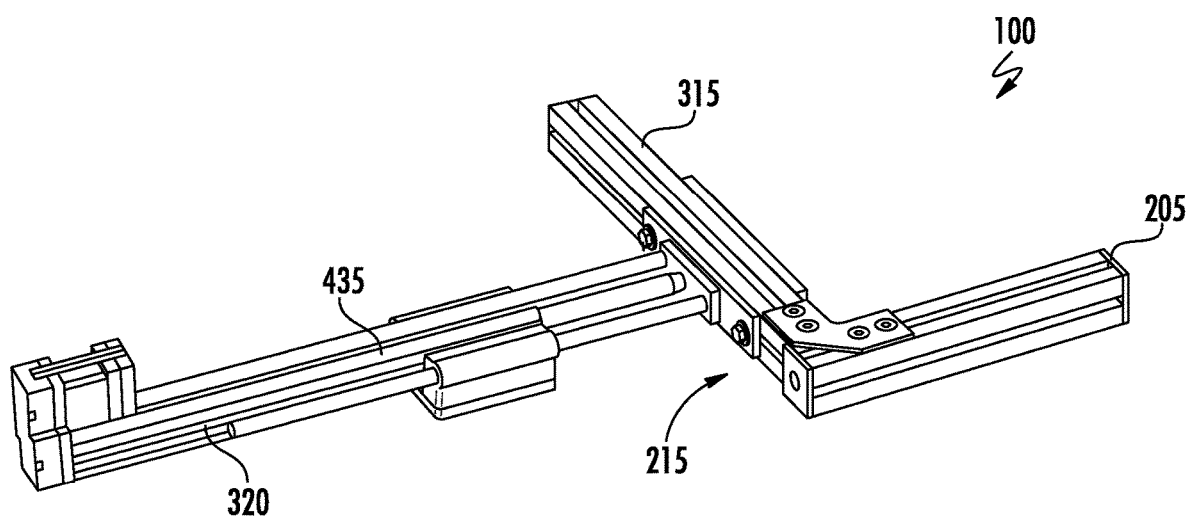

FIG. 5a and FIG. 5b illustrate a perspective view of the tote exchange module 100 depicting the L-shaped pushing member 205, in accordance with one or more embodiments of the present disclosure. As shown in FIG. 5a, the L-shaped pushing member 205 is positioned in the first position 210. As described above, the L-shaped pushing member 205 may include the actuator 320, as shown. In an embodiment, the actuator 320 may further include an actuating arm 435 coupled to the side element 315 of the L-shaped pushing member 205, as shown in FIG. 5a and FIG. 5b. The actuating arm 435 may reciprocate transverse to the transport direction of the pick-up conveyor from the first side towards the second side of the pick-up conveyor, as shown in FIG. 4. FIG. 5b illustrates the L-shaped pushing member 205 positioned in the second position 215. As shown in FIG. 5b, the actuating arm 435 may be extended by the actuator 320 to move the L-shaped pushing member 205 in the second position 215. In an embodiment, the actuating arm 435 may include one or more telescopic rods that may extend and/or retract to move the L-shaped pushing member 205 in a reciprocating manner. Further, the actuator 320 may include any translational mechanism for moving the actuating arm 435, as described above. In an embodiment, the actuator 320 may include a lead screw drive having a lead screw coupled to a drive motor, such that the rotational motion of the drive motor may be translated into a linear motion of the actuating arm 435. Thus, the L-shaped pushing member 205 positions one or more totes in a pick-up location corresponding to an automated picking system. Hence, improving efficiency and providing an interface between incompatible conveyor systems and picking systems.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A tote exchange module comprising:
a conveyor comprising a forward end, an opposite trailing end, a first side and a second side approximately parallel to a transport direction of the conveyor, and a conveyance system positioned between the first side and the second side and configured to transport one or more totes along the conveyance system in the transport direction, the transport direction of the conveyor being in the direction from the trailing end toward the forward end, the second side comprising a wall;

an L-shaped pushing member comprising:
  a forward element, the forward element comprising a forward surface oriented transverse to the transport direction and having a first forward surface end and a second forward surface end, and
  a side element, the side element comprising a side surface oriented approximately parallel to the transport direction and having a forward side surface end and a trailing side surface end,
  wherein (a) the forward element is secured to the side element at the first forward surface end of the forward surface and the forward side surface end of the side surface, (b) the forward side surface end of the side surface is closer to the forward end than the trailing side surface end, and (c) the second forward surface end is closer to the second side than the first forward surface end, and
  an actuator configured to move the L-shaped pushing member from a first position proximate to the first side to a second position proximate to the wall to cause a tote to move into a predefined orientation at the second position, wherein the wall is configured to receive the tote in the predefined orientation at the second position.

2. The tote exchange module of claim 1, wherein when the tote travels along the conveyance system in the transport direction, the forward surface is configured to stop movement of the tote in the transport direction, and the side surface is configured to cause the movement of the tote in a direction transverse to the transport direction.

3. The tote exchange module of claim 1, wherein the actuator further comprises an actuating arm coupled to the side element of the L-shaped pushing member, the actuating arm configured to reciprocate transverse to the transport direction from the first side towards the second side of the conveyor.

4. The tote exchange module of claim 1, wherein the second position defines a pick-up location of the tote.

5. The tote exchange module of claim 4, wherein the tote exchange module further comprises one or more photoeyes, the one or more photoeyes configured to confirm at least one of the presence of the tote at the pick-up location or the predefined orientation of the tote located at the pickup location.

6. The tote exchange module of claim 4, further comprising an exchange equipment configured to pick-up the tote located at the pick-up location responsive to processing of data captured by the one or more photoeyes indicating at least one of the presence or the predefined orientation of the tote satisfies a threshold requirement.

7. The tote exchange module of claim 6, wherein the exchange equipment moves the tote from the pick-up location to a tote receiving position corresponding to a second conveyor.

8. A tote exchange module comprising:
  a first conveyor comprising a forward end, an opposite trailing end, a first side and a second side approximately parallel to a transport direction of the first conveyor, and a conveyance system positioned between the first side and the second side and configured to transport one or more totes along the conveyance system in the transport direction, the transport direction of the first conveyor being in the direction from the trailing end toward the forward end, the second side comprising a wall;
  an L-shaped pushing member comprising:
    a forward element, the forward element comprising a forward surface orientated transverse to the transport direction and having a first forward surface end and a second forward surface end, and
    a side element, the side element comprising a side surface oriented approximately parallel to the transport direction and having a forward side surface end and a trailing side surface end,
    wherein (a) the forward element is secured to the side element at the first forward surface end of the forward surface and the forward side surface end of the side surface, (b) the forward side surface end of the side surface is closer to the forward end than the trailing side surface end, and (c) the second forward surface end is closer to the second side than the first forward surface end,
  an actuator configured to move the L-shaped pushing member from a first position proximate to the first side to a second position proximate to the wall to cause a tote to move into a predefined orientation at the second position, and wherein the wall is configured to receive the tote in the predefined orientation at the second position, the second position defining a pick-up location;
  a second conveyor;
  a tote receiving position proximate to the second conveyor; and
  a tote release system configured to move the tote located at the tote receiving position onto the second conveyor.

9. The tote exchange module of claim 8, further comprising an exchange equipment configured to pick-up the tote located at the pick-up location and place the tote at the tote receiving position.

10. The tote exchange module of claim 8, wherein the tote release system is configured to move the tote in a second transport direction, opposite to the transport direction of the first conveyor, towards the second conveyor.

11. The tote exchange module of claim 8, wherein the tote release system is located adjacent to the second side of the first conveyor.

12. The tote exchange module of claim 9, wherein the exchange equipment is configured to pick-up empty totes from the first conveyor and place filled totes on the tote release system.

13. The tote exchange module of claim 1, further comprising a tote release system configured to move the tote located at a tote receiving position onto a second conveyor, wherein the tote release system comprises a plurality of timing belts that are driven together via a set of timing pulleys clamped to a motorized drive roller, wherein at least one of the plurality of timing belts comprises one or more cleats configured to receive and align the tote on the at least one of the plurality of timing belts, and wherein the one or more cleats further comprise one or more proximity sensor targets configured to detect the presence of the tote on the at least one of the plurality of timing belts.

14. The tote exchange module of claim 13, wherein the tote release system is further configured to move the tote in a second transport direction, opposite to the transport direction of the conveyor, towards the second conveyor from the tote receiving position.

15. The tote exchange module of claim 13, wherein the tote release system is further configured to receive the tote from an exchange equipment in a tote release position.

16. The tote exchange module of claim 13, further comprising one or more photoeyes configured to confirm the presence of the tote on an exchange equipment, and wherein the plurality of timing belts are configured to move the one or more cleats in a receiving position responsive to processing of data captured by the one or more photoeyes indicating the presence of the tote on the exchange equipment.

17. The tote exchange module of claim 8, wherein the tote release system comprises a plurality of timing belts that are driven together via a set of timing pulleys clamped to a motorized drive roller, wherein at least one of the plurality of timing belts comprises one or more cleats, and wherein the one or more cleats are configured to receive and align the tote on the at least one of the plurality of timing belts.

18. The tote exchange module of claim 17, wherein the one or more cleats comprise one or more proximity sensor targets configured to detect the presence of the tote on the at least one of the plurality of timing belts.

19. The tote exchange module of claim 9, wherein the tote release system is further configured to receive the tote from the exchange equipment in a tote release position.

20. The tote exchange module of claim 17, further comprising one or more photoeyes configured to confirm the presence of the tote on an exchange equipment, wherein the plurality of timing belts are configured to move the one or more cleats in a receiving position responsive to processing of data captured by the one or more photoeyes indicating the presence of the tote on the exchange equipment.

* * * * *